Oct. 7, 1941.  A. SCHUMACHER  2,258,519
APPARATUS FOR DISTRIBUTING MATERIALS
Filed May 31, 1938  2 Sheets-Sheet 1

Inventor
August Schumacher
By N. D. Parker Jr.
Attorney

Oct. 7, 1941. A. SCHUMACHER 2,258,519
APPARATUS FOR DISTRIBUTING MATERIALS
Filed May 31, 1938 2 Sheets-Sheet 2
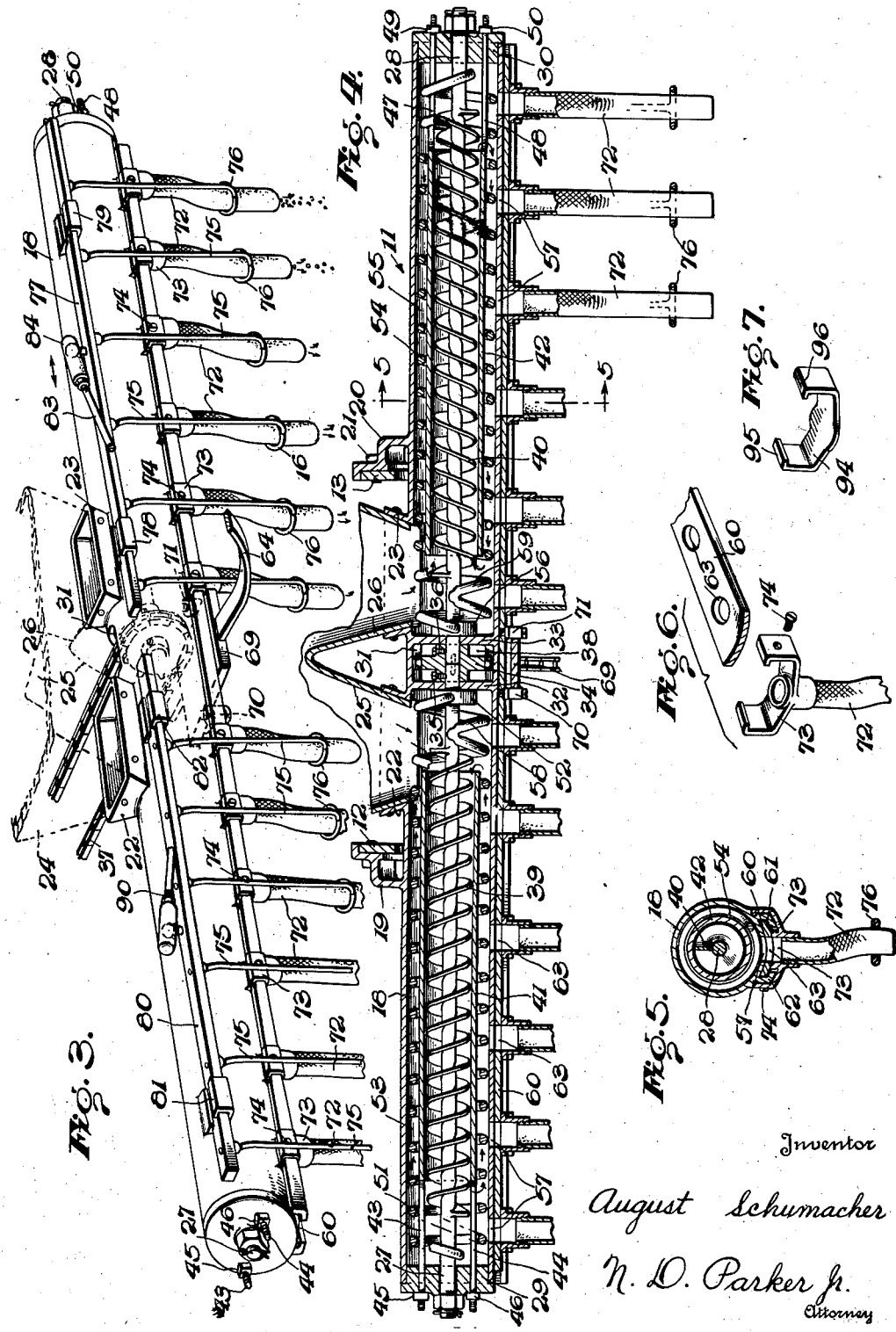
Inventor
August Schumacher
N. D. Parker Jr.
Attorney Patented Oct. 7, 1941

2,258,519

UNITED STATES PATENT OFFICE 2,258,519

APPARATUS FOR DISTRIBUTING MATERIALS

August Schumacher, Flushing, N. Y.

Application May 31, 1938, Serial No. 210,959

4 Claims. (Cl. 275—2)

This invention relates to apparatus for distributing materials and more particularly to an agricultural implement which is especially adaptable for distributing fertilizer, seeds of various character, or any material which is broadcasted over the soil.

Various types of mechanisms for the broadcast distribution of fertilizer, seed and other materials have been heretofore provided. Such prior devices have included power-operated as well as hand-operated types. In the case of each class of machine mentioned, one of the important problems encountered is the even and uniform distribution of the material upon the soil as the machine traverses the field. It is highly desirable, from the standpoint of expenditure of time and labor, to cover as wide a path as possible during operation of the machine. The width of such path is subject to certain limitations, among which may be mentioned the packing of the material adjacent the outer ends of the distributing devices, remote from the centrally-positioned source of material supply. This packing may render impossible the uniform distribution of the material adjacent such outer ends.

In addition to the above, it has been found that, with the present type of machines, the uniform distribution of fertilizer is difficult to attain under relatively high moisture conditions, which tend to cake the fertilizer and render it lumpy. This clogs the distributing apparatus and results in non-uniform distribution and even breakage of certain of the operative portions of the apparatus.

It is accordingly one of the objects of the present invention to provide a distributing mechanism which shall be so constructed and arranged as to overcome the disadvantages inherent in the prior art devices.

Another object of the invention is to provide a mechanism of the foregoing character which will be capable of uniformly distributing the material over a substantially wide area.

Still another object contemplates the provision of a novel mechanism in a device of the above type for insuring a continued and even distribution of the fertilizer or other material notwithstanding the fact that varying moisture conditions may render the same caked and lumpy.

Still another object resides in a novel assembly of parts constituting the distributing mechanism, which will dispense with the necessity of bulky and expensive power-operated devices, will be light in weight as well as economical of manufacture, and which will uniformly distribute the material over a wide path without clogging.

Other novel features and advantages of the invention, not heretofore outlined, will appear more fully hereinafter from the following detailed description, when considered in connection with the accompanying drawings, wherein one form of the invention has been illustrated. It is to be expressly understood, however, that the drawings are utilized for purposes of illustration only and are not designed as a definition of the limits of the invention, reference being had for this purpose to the claims appended hereto.

In the drawings, wherein similar reference characters refer to like parts throughout the several views:

Fig. 3 is a partial view in perspective of the distributor housing and associated distributing spouts;

Fig. 4 is a fragmentary longitudinal axial sectional view of the distributor;

Fig. 5 is a transverse sectional view taken along lines 5—5 of Fig. 4;

Fig. 6 is a diagrammatic view in perspective of a distributor spout and a portion of the valve plate, and Fig. 7 is a perspective view of one of the removable closure clips which may be employed.

Figure 1:
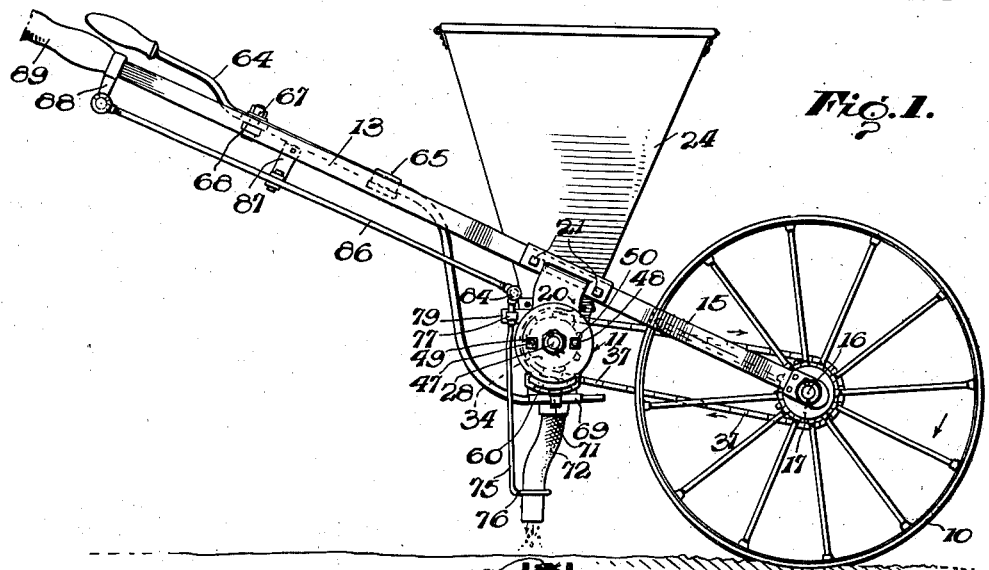
Fig. 1 is a side view of a distributing mechanism embodying the principles of the present invention.
Figure 2:
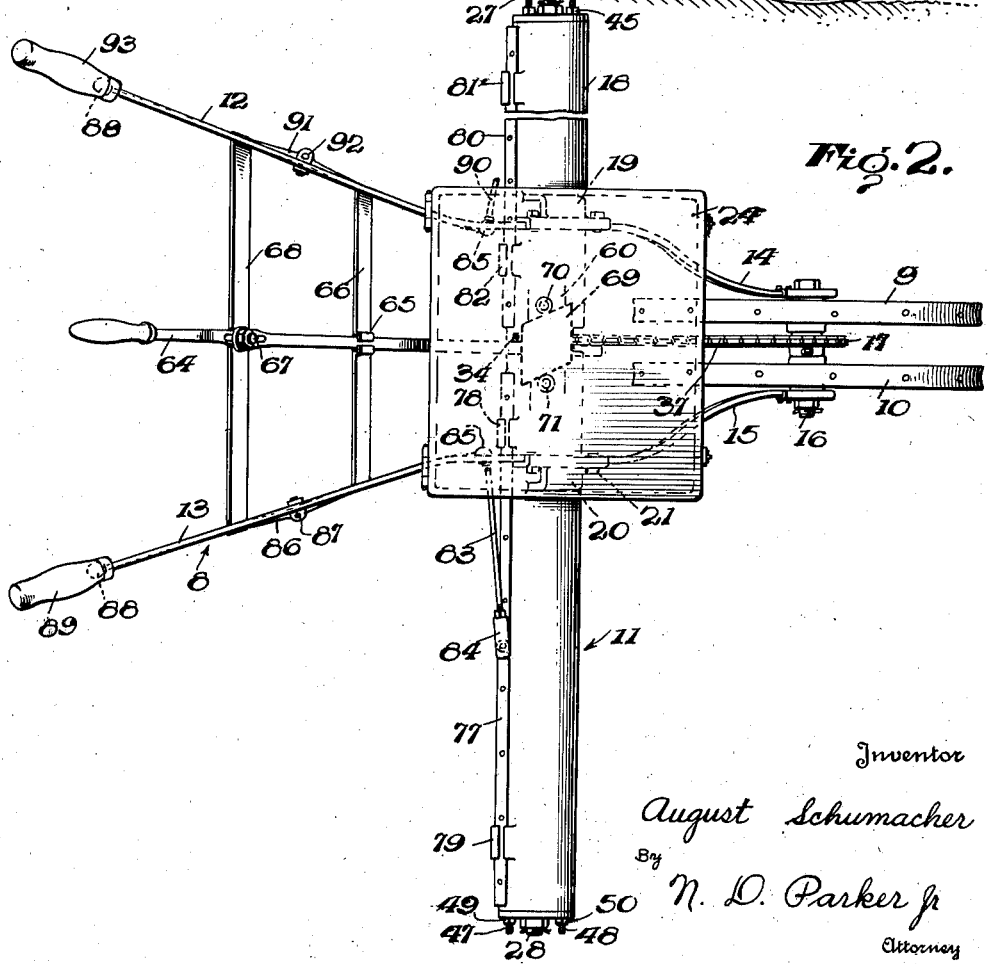
Fig. 2 is a partial top view of the mechanism of Fig. 1.

A distributing mechanism embodying the principles of the present invention is disclosed more particularly in Figs. 1 and 2 of the accompanying drawings as including a frame 8 having a pair of ground-engaging wheels 9 and 10 rotatably supported thereby, and carrying a conveyor or distributing device 11.

The frame is preferably constituted by a pair of handle members 12 and 13, said members being bent inwardly at their forward portions thereof in order to form wheel-supporting extensions 14 and 15. The wheels 9 and 10 are suitably mounted upon an axle 16 carried by extensions 14 and 15, and interposed between the wheels is a driving sprocket 17 which may be drivably connected with the wheels in such manner that rotation of the wheels effects rotation of the sprocket.

Intermediate the extremities of the frame members 12 and 13, the distributor 11 is supported, and, referring more particularly to Fig. 4, such distributor includes a housing 18 upon which a pair of brackets 19 and 20 are secured for attachment to the frame members 12 and 13 as by means of bolts 21, see Fig. 1. Preferably, in order to provide a more rigid structure, the housing 18 is continuous from one end to the other, although it will be understood that the same may be formed in two aligned sections, suitably secured together in the center, if desired. In order that the distributor 11 may have a supply of fertilizer or other material conducted thereto for subsequent distribution, the housing 18 is formed with a pair of spaced-apart flanged openings 22 and 23, a hopper 24, for the fertilizer or other material, being adapted to be secured to the aforesaid flanged openings. As will be readily perceived from Fig. 4, the hopper 24 is provided with depending chute portions 25 and 26 respectively registering and secured to the flanged openings 22 and 23.

One of the features of the present invention resides in the provision of a novel conveying mechanism for uniformly and evenly distributing the fertilizer or other material supplied to the distributor 11 by the hopper 24 during operation of the apparatus. To this end, a pair of shafts 27 and 28 are provided, the outer ends of said shafts being suitably rotatably mounted in end closures 29 and 30, while the inner ends of the shafts are adapted to abut within a drive chamber 31 formed at the central portion of the housing 18. Such drive chamber is constituted by spaced-apart walls 32 and 33 and houses a sprocket wheel 34 which is suitably splined to the shafts 27 and 28 and connected thereto as by means of set screws 35 and 36. A chain 37 drivably connects sprocket 34 with sprocket 17 and, as will appear more fully from Fig. 4, the chamber 31 is provided with an opening 38 permitting insertion of sprocket 34 and allowing the chain 37 to function properly.

Conveyor means are drivably connected to the shafts 27 and 28 for continuously circulating the fertilizer or other material in opposite directions, outwardly from the central portion of the distributor 11, and such mechanism is so constituted as to constantly maintain the material in circulation, thus preventing packing thereof and clogging of the distributor. To this end, worms 39 and 40 are secured, throughout the lengths thereof, to the shafts 27 and 28 respectively, the said worms being housed within tubular casings 41 and 42. The outer end of casing 41 is spaced from closure 29 and is provided with a pair of rods 43 and 44 which are connected to said closure as by means of nuts 45 and 46, the casing 42 being similarly secured to the closure 30 as by means of rods 47 and 48, provided with nuts 49 and 50 respectively. The worms 39 and 40 are oppositely pitched, as shown in Fig. 4, and the construction is such that, during rotation of shafts 27 and 28, through operation of the driving mechanism constituted by sprocket 17, chain 37 and sprocket 34, material passing from the hopper through flanged openings 22 and 23 and housing 18 will be moved from the central portion of said housing outwardly towards the ends thereof in opposite directions. The movement of the material will be conducted through the casings 41 and 42 and the action of the worms therein, not only moves the material outwardly through the casings, but effectively breaks up any lumpy material.

For the purpose of effecting the continuous movement of the material after the same has been conveyed to the outer ends of the housing 18, in order to prevent packing at said outer ends and to secure the even distribution referred to above, a second screw-type conveyor is associated with each of the conveyors 39 and 40. Preferably, the second screw-type conveyor is of the coil spring type having one end only connected with the driving shaft. As shown, a screw-type coil spring conveyor 51, having its inner end thereof fastened to a collar 52 carried by shaft 27, is housed within a chamber 53 defined by housing 18 and casing 41. This conveyor surrounds casing 41 and extends to a point adjacent the closure 29. The only connection between the conveyor and shaft 27 is through the collar 52. A similar coil spring conveyor 54 is positioned within a chamber 55 defined by housing 18 and casing 42, such conveyor being secured at one end only to the shaft 28 as by means of collar 56 carried by said shaft.

It is to be particularly pointed out that the conveyor 51 is oppositely pitched as respects conveyor 39, while the same is true as regards conveyors 54 and 40. By this construction, the material which is conducted by the conveyors 39 and 40 in opposite directions towards the outer ends of the housing 18 is caught by the coil spring conveyors 51 and 54 as it emerges from the outer ends of casings 41 and 42 and is returned toward the center of the distributor. During the return movement of the material, the same falls outwardly through openings 57 spaced along the bottom of the housing 18. By the provision of the aforementioned construction, packing of the material at the outer ends of the housing 18 is avoided and an even flow and distribution is obtained notwithstanding the tendency of the fertilizer to become caked and lumpy due to excessive moisture conditions. In order to prevent any tendency of the material to become packed adjacent the central chamber 31, the inner ends of the conveyors 51 and 54 are provided with short reversed-pitch portions 58 and 59 which have the tendency to continuously force the material away from the abutments 32 and 33 during operation of the mechanism.

Means are provided by the present invention for varying the flow of the material through the outlet openings 57 and preferably such means are so constituted as to be selectively operated by the operator from a point conveniently located adjacent the handle members 12 and 13. In the form shown, a valve plate 60 is slidably mounted against the bottom portion of the housing 18, such plate being supported from the housing as by means of longitudinally-extending ribs 61 and 62, Fig. 5, and conforming to the curvature of the housing. In the normal position of the plate, openings 63 thereof, corresponding in number and relative spacing to the openings 57, are adapted to register with the last named openings in order to permit the maximum flow of the material from the distributor. However, this plate is movable lengthwise of the housing 18 in order to vary the degree of registration of openings 63 and 57, such movement of the plate being controlled by movement of a control lever 64 positioned adjacent the handle members 12 and 13. Referring more particularly to Figs. 2 and 4, the control lever 64 is slidably mounted in a bracket 65 carried by a cross-brace 66 secured to members 12 and 13. The lever 64 is restrained for limited longitudinal movement along its length as by means of a pin and slot connection 67, connecting the lever with a cross-brace 68, likewise connected to members 12 and 13. The opposite end of the control member 64, as will appear more fully from Figs. 2 and 3, is secured to a cam plate 69, adapted to cooperate with rollers 70 and 71 secured to the valve plate 60. The cam plate is so arranged that movement of the control member 64 in one direction, as limited by the pin and slot connection 67, will effect movement of plate 60 along its length in one direction a sufficient distance to fully close openings 57 in the housing 18. On the other hand, movement of the control member 64 in the opposite direction, a distance governed by the pin and slot connection 67, will effect movement of the plate 60 to the position shown in Fig. 4 where the openings 57 are uncovered. It will be understood that movement of the control member 64, to positions between the limits above mentioned, will serve to partially close the openings 57, in which event the flow of material will be decreased. Since the position of the lever 64 with respect to the cross-brace 68 will govern the location of the valve plate 60 with respect to the openings 57, any suitable indicia, not shown, may be placed on the lever adjacent said cross-brace if desired, said indicia being cooperable with a suitable reference mark on the cross-brace, not shown, and thereby indicating to the operator the extent of flow of the material. Thus, by the construction just described, the operator may vary the distribution of material from zero to a maximum at will.

In order to effect the final distribution of the material to the soil, as close to the latter as possible, thus minimizing the effect of wind upon the distribution of the material, spouts are associated with each of the distributor openings. These spouts are preferably formed of flexible material and have means associated therewith for varying the position thereof with respect to the distributor, this feature enabling the operator to control the direction of delivery of the material for the purpose of compensating for variations in the distances between plant rows. In the form illustrated, flexible spouts 72 are provided with fittings 73, see Figs. 5 and 6, which are so formed as to permit them to be slid along ribs 61 and 62 from the outer ends thereof, into proper position adjacent openings 57, following which the fittings 73 are secured in position as by means of set screws 74. Associated with each spout is a rod 75, the lower end of which is provided with a portion 76 embracing the spouts adjacent the lower extremities thereof. Referring more particularly to Fig. 3, the upper ends of the rods 75 which are located to the right of the central portion of the distributor are connected to a bar 77 slidably mounted in brackets 78 and 79 carried by the housing 18. Those rods positioned to the left of the central portion of the distributor, as viewed in Fig. 3, are secured at their upper ends to a bar 80 which is slidably mounted in brackets 81 and 82 carried by the housing 18. Means are provided for separately and independently reciprocating the bars 77 and 80 so that the battery of spouts controlled by each bar may be moved in the same or opposite directions for the purpose set forth hereinabove.

In order to effect movement of the bar 77 and the battery of spouts associated therewith, the said bar is provided with a rod 83 having a ball and socket connection 84 therewith, the other end of the rod 83 being connected through a ball and socket joint 85 to one end of a lever 86. This lever, see Figs. 1 and 2, is pivotally mounted intermediate its ends to the handle member 13 as by means of a bracket 87, the outer end of the lever being operatively connected to a link 88 carried by a handle grip 89. This latter is rotatably mounted on the upper end of the handle member 13, and, upon rotative movement thereof by the operator, the lever 86 is moved about the pivotal connection 87. The lower end of the lever 86 thus will move in a plane parallel to the plane of movement of bar 77 and will, through the rod 83, move said bar and the spouts controlled thereby in one direction or the other, depending upon the direction of rotation of the handle grip 89.

The bar 80 is moved in a manner similar to that above described in connection with bar 77. As shown, Figs. 2 and 3, bar 80 is connected with a rod 90 which in turn is connected to a lever 91 oscillatably mounted upon the handle member 12 at 92. Oscillation of lever 91 is controlled by the operator through rotative movement of a handle grip 93.

It may sometimes be found desirable to cut off the flow of material through one or more of the openings 57 without disturbing the distribution through the remaining openings. For this purpose, the present invention contemplates the provision of a novel spring closure clip 94, see Fig. 7, which is provided with a pair of spring arms 95 and 96. This clip is so constituted that it may be sprung into position over ribs 61 and 62 in order to close any desired opening 57. It will of course be understood that, in applying the closure clip, the spout fitting 73 associated with the particular opening 57, which it is desired to close, will be moved to one side to permit application of the closure clip.

During operation of the distributing mechanism heretofore described, the operating member 64 is initially manipulated to such a position that the cam 69 moves slide 60 to effect a closure of all of the openings 57. Thereafter, a supply of fertilizer or other material is placed within hopper 24 and falls by gravity through openings 22 and 23 and envelops the inner ends of the screw conveyors 39, 40, 51 and 54. Thereafter, the operator moves the device in order to operate the conveyors and assure the complete filling of the housing 18 with the material to be distributed. With the machine in proper position with respect to the area to be covered, the control member 64 may then be manipulated so that the plate 60 uncovers the openings 57 the desired amount. Following the above adjustments, it is only necessary for the operator to push the machine over the area to be treated and movement of the wheels 9 and 10 will, through the driving connections 17, 34 and 37, operate the conveyors in order to effect a uniform distribution of the material. At any time, when the operator desires to effect a lateral change in the direction of flow of the material, as regards the course of the machine across the field, it is only necessary to manipulate one or the other of the handle grips 89 or 93 whereupon the battery of spouts controlled thereby will be laterally shifted. Moreover, the operator may readily vary the amount of material distributed by adjusting the position of lever 64, thus shifting the valve plate 60. As has been particularly pointed out hereinbefore, the spring type conveyors 51 and 54 are anchored to the driving shafts 27 and 28 at one end only. The method of assembly of these conveyors with the remainder of the apparatus is preferably such that, during operation of the device, each of the aforesaid conveyors will tend to unwind as the material is conveyed thereby from the outer ends of the distributor towards the central portion thereof. This construction avoids any tendency of the springs to wrap down and bind upon casings 41 and 42 which would otherwise occur if the springs had a pitch opposite to that shown.

There has thus been provided by the present invention a novel distributing apparatus which is especially desirable and efficient in broadcasting fertilizer or other materials. The provision of the conveying mechanism disclosed herein enables an unusually wide path of distribution to be covered during one traverse of the field. The use of such distributing mechanism, moreover, positively maintains the material in circulation to the end that a uniform flow thereof may be achieved notwithstanding the tendency of some materials to cake and lump due to changes of moisture conditions. The apparatus is, moreover, of a rigid and rugged nature and is capable of construction of light-weight materials, thereby rendering the same especially useful for manual operation.

While a preferred form of the invention has been herein disclosed and described with considerable particularity, it is to be expressly understood that the invention is not limited to this form but is capable of expression in various other embodiments as well known to those skilled in the art. Reference will, therefore, be had to the appended claims for a definition of the limits of the invention.

What is claimed is:

1. A device for distributing fertilizer and like material comprising a frame, a hopper supported thereby and adapted to contain a supply of material to be distributed, a tubular housing carried by said frame and having an opening for receiving material from said hopper, said housing being provided with a plurality of openings spaced along the length thereof and through which the material is distributed, a shaft rotatably mounted in said housing, means for driving said shaft, a screw conveyor secured to said shaft and extending from said first opening substantially throughout said housing for conveying material fed to said first opening along the length of the housing in one direction, a second conveyor having one end only secured to said shaft adjacent said first opening for conveying the material throughout the housing adjacent said plurality of openings in the opposite direction, said second conveyor being formed of a member wound spirally in one direction around but spaced from and free of the screw conveyor and being provided with a relatively short section adjacent said first opening, said section being wound in an opposite direction with respect to the remaining portion of said second conveyor.

2. A device for distributing fertilizer and like material comprising a frame, an elongated housing extending transversely of the frame and provided with a hopper for receiving a supply of the material to be distributed, said housing having an opening communicating with said hopper, the housing being provided with a plurality of openings spaced along the length thereof and through which the material is distributed, and means for uniformly distributing the material through said opening comprising a shaft rotatably mounted in said housing, means for driving said shaft, and a pair of elongated concentrically-arranged screw conveyors of different diameters, said conveyors being positioned within the housing and drivably connected with said shaft, the outer conveyor being formed of a coil spring member wound spirally around but spaced from and free of the inner conveyor and having one end only connected with said shaft adjacent said first opening, said outer conveyor being provided with a relatively short section adjacent said opening having its convolutions wound in the opposite direction as respects the remainder of said outer conveyor to thereby secure a reversed pitch.

3. A device for distributing fertilizer and like material comprising a frame, an elongated housing supported on the frame and provided with a hopper for receiving a supply of the material to be distributed, said housing communicating with said hopper and being provided with a plurality of openings spaced along the length thereof and through which the material is distributed, and means for uniformly distributing the material through said openings comprising a second housing within the first housing and defining a chamber therebetween, a shaft extending through said second housing, a screw conveyor attached to said shaft for conveying the material through the second housing in one direction, and a second screw conveyor positioned in said chamber for moving the material in the opposite direction through the chamber, said second conveyor being formed of a member wound spirally around said second housing and spaced therefrom, said second conveyor having one end only secured to said shaft and extending substantially throughout the length of said elongated housing.

4. A device for distributing materials comprising a frame, an elongated tubular housing supported by said frame and extending transversely thereof, means including a hopper positioned intermediate the ends of said housing and dividing the latter into a pair of oppositely-extending tubular chambers, each of said chambers having an opening communicating with said hopper and being provided also with a plurality of openings spaced along the bottom and through which the material fed to said hopper is distributed, a shaft rotatably mounted in each of said chambers and extending throughout the length thereof, means for driving both said shafts in one direction, a screw conveyor secured to each of said shafts in each respective chamber and extending substantially throughout the length of the latter for conveying material fed from said hopper through said first openings outwardly towards the outer ends of said chambers, and a second conveyor positioned in each of said chambers around and spaced from said screw conveyors and coextensive with the length of the latter for conveying the material from the outer ends of the chambers toward the inner ends thereof and past said plurality of openings for distribution therethrough, each of said second conveyors being formed of a coil spring wound to secure an opposite pitch from that of its cooperating screw conveyor and being connected at its inner end only with said shaft, whereby during operation the resistance to movement of the material tends to effect an increase in the diameter of said second conveyors.

AUGUST SCHUMACHER.